(12) United States Patent
Tomoshi et al.

(10) Patent No.: US 10,317,516 B2
(45) Date of Patent: Jun. 11, 2019

(54) OPTICAL SAFETY SYSTEM

(71) Applicant: Keyence Corporation, Osaka (JP)

(72) Inventors: Satoru Tomoshi, Osaka (JP); Kentaro Yamazaki, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/410,797

(22) Filed: Jan. 20, 2017

(65) Prior Publication Data

US 2017/0242110 A1 Aug. 24, 2017

(30) Foreign Application Priority Data

Feb. 22, 2016 (JP) .................................. 2016-031513

(51) Int. Cl.
| | |
|---|---|
| *G01S 7/51* | (2006.01) |
| *G01S 7/48* | (2006.01) |
| *G01S 7/481* | (2006.01) |
| *G01S 17/42* | (2006.01) |
| *G08B 13/24* | (2006.01) |

(Continued)

(52) U.S. Cl.
CPC ............. *G01S 7/51* (2013.01); *G01S 7/4808* (2013.01); *G01S 7/4817* (2013.01); *G01S 17/42* (2013.01); *G08B 13/187* (2013.01); *G08B 13/1968* (2013.01); *G08B 13/19682* (2013.01); *G08B 13/2491* (2013.01); *G08B 29/183* (2013.01)

(58) Field of Classification Search
CPC .......... G01S 7/51; G01S 7/4808; G01S 17/42; G01S 7/4817; G01S 17/89; G01S 17/026; G01S 17/48; G01S 17/003; G01S 17/88; G08B 13/2491; B33Y 80/00; B60R 16/037; B60R 2001/1223; B60R 2001/1253; B60R 2021/0027; B60R 2021/01315; B60R 21/013; B60R 21/0134; B60R 21/0136; B60R 21/01516; B60R 21/0152; B60R 21/0153; B60R 21/01534; B60R 21/01536; B60R 21/01538; B60R 21/01542; B60R 21/01544; B60R 21/01548; B60R 21/01554; B60R 25/25; B60R 25/252; B60R 25/255; B60R 25/257; G01J 3/0289; G01V 8/14; G01V 8/18; G06K 9/00362; G06K 9/00832
See application file for complete search history.

(56) References Cited

U.S. PATENT DOCUMENTS 5,875,108 A * 2/1999 Hoffberg ................. G06F 3/00
700/17
6,259,516 B1 * 7/2001 Carter ................. G01F 23/292
250/577

(Continued)

*Primary Examiner* — Mohamed K Amara
(74) *Attorney, Agent, or Firm* — Kilyk & Bowersox, P.L.L.C.

(57) ABSTRACT

Provided is an optical safety system that enables simplification of an editing operation for area designation information. A safety scanner includes an intrusion sensing section that determines the presence or absence of an intruder into a protection area. The setting support device includes a pseudo determination information generation section that determines a presence or absence of an intruder into a protection area on the basis of an area designation information before being transmitted to the safety scanner and a distance measurement information received from the safety scanner and generates a pseudo determination information indicating the determination result.

9 Claims, 10 Drawing Sheets

(51) Int. Cl.
*G08B 13/187* (2006.01)
*G08B 13/196* (2006.01)
*G08B 29/18* (2006.01)

(56) References Cited

U.S. PATENT DOCUMENTS

| | | | |
|---|---|---|---|
| 7,598,484 B2 | 10/2009 | Yamaguchi | |
| 7,655,895 B2* | 2/2010 | Breed | B60R 21/01516 |
| | | | 250/206.1 |
| 7,863,897 B2* | 1/2011 | Slocum, Jr. | A61B 6/583 |
| | | | 324/307 |
| 8,063,780 B2 | 11/2011 | Onishi | |
| 8,069,007 B2 | 11/2011 | Oh | |
| 8,203,702 B1* | 6/2012 | Kane | G01J 3/02 |
| | | | 356/139.05 |
| 8,248,235 B2 | 8/2012 | Inoue et al. | |
| 8,319,171 B2 | 11/2012 | Kawabata | |
| 8,330,095 B2 | 12/2012 | Kawabata | |
| 8,415,609 B2* | 4/2013 | Kawabata | G01S 7/4812 |
| | | | 250/221 |
| 8,648,292 B2 | 2/2014 | Kawabata et al. | |
| 8,680,991 B2* | 3/2014 | Tran | G06F 19/3418 |
| | | | 340/540 |
| 8,946,938 B2* | 2/2015 | Kesler | B60L 11/182 |
| | | | 307/104 |
| 8,982,363 B2* | 3/2015 | Goyal | G01S 7/4866 |
| | | | 356/634 |
| 9,630,105 B2* | 4/2017 | Stafford | G06F 3/0304 |
| 9,933,510 B2* | 4/2018 | Yamazaki | G01S 7/4808 |
| 2008/0094212 A1* | 4/2008 | Breed | G08B 13/1663 |
| | | | 340/541 |
| 2009/0092284 A1* | 4/2009 | Breed | B60J 10/00 |
| | | | 382/103 |
| 2009/0283666 A1* | 11/2009 | Tagashira | G01S 7/4813 |
| | | | 250/216 |
| 2009/0295577 A1* | 12/2009 | Yamaguchi | G01S 17/026 |
| | | | 340/541 |
| 2010/0194583 A1* | 8/2010 | Kawabata | G01S 7/4812 |
| | | | 340/3.6 |
| 2012/0238132 A1* | 9/2012 | McSweyn | H01R 13/72 |
| | | | 439/501 |
| 2013/0187032 A1* | 7/2013 | Kawabata | G01S 7/4812 |
| | | | 250/214 SW |
| 2013/0300840 A1* | 11/2013 | Borowski | G01S 7/483 |
| | | | 348/50 |
| 2014/0078498 A1* | 3/2014 | Ikushima | G01N 21/88 |
| | | | 356/237.1 |
| 2015/0022637 A1* | 1/2015 | Saeki | G06T 7/0004 |
| | | | 348/46 |
| 2015/0253428 A1* | 9/2015 | Holz | G01S 17/42 |
| | | | 356/5.01 |
| 2015/0369618 A1* | 12/2015 | Barnard | H05B 37/0272 |
| | | | 701/491 |
| 2016/0155306 A1 | 6/2016 | Kawanaka et al. | |
| 2016/0163171 A1 | 6/2016 | Yamazaki et al. | |
| 2017/0176575 A1* | 6/2017 | Smits | G01S 17/003 |
| 2017/0219709 A1* | 8/2017 | Send | G01C 3/08 |
| 2017/0242099 A1 | 8/2017 | Yamazaki | |
| 2017/0242101 A1 | 8/2017 | Oh | |
| 2017/0242111 A1 | 8/2017 | Tagashira et al. | |
| 2017/0242123 A1 | 8/2017 | Yamazaki et al. | |

\* cited by examiner

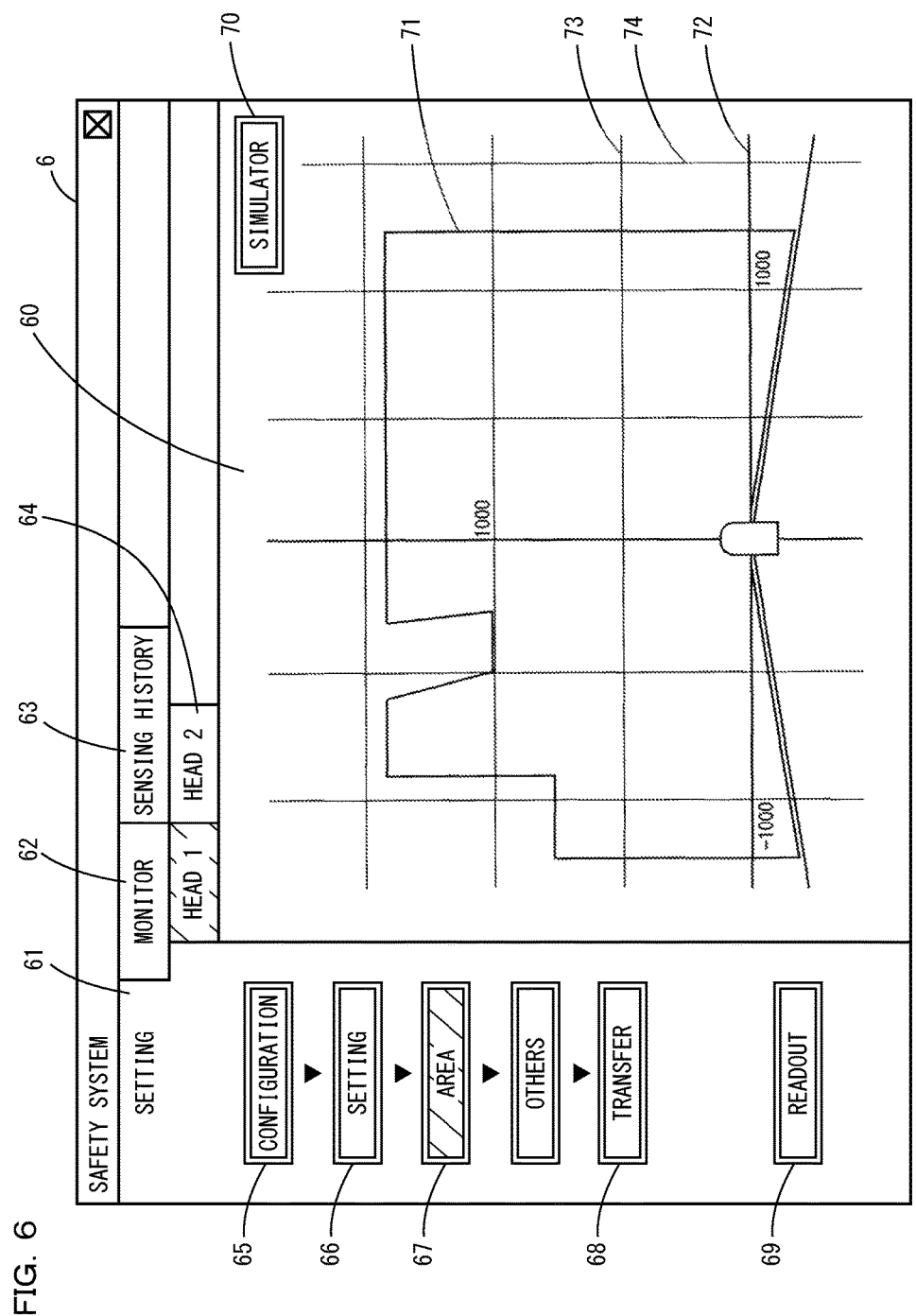

OPTICAL SAFETY SYSTEM

CROSS-REFERENCE TO RELATED APPLICATIONS

The present application claims foreign priority based on Japanese Patent Application No. 2016-031513, filed Feb. 22, 2016, the contents of which is incorporated herein by reference.

BACKGROUND OF THE INVENTION

1. Field of the Invention

The present invention relates to an optical safety system, and, more particularly, to an improvement of an optical safety system provided with a safety scanner that senses an intruder within a protection area and outputs a sensing signal and a setting support device that generates area designation information designating the protection area.

2. Description of Related Art

An optical safety sensor is an area monitoring device which optically senses an intruder such as a person intruded into a protection area and outputs a safety control signal for emergently stopping a machine such as a machine tool or an industrial robot (e.g., JP 2009-296087 A and JP 2009-294734A).

For example, a safety scanner is an optical scanning area monitoring device provided with a light emitting part which emits detection light toward an object, a light receiving part which receives reflected light from the object and generates a light receiving signal, a distance calculation part which obtains a distance to the object on the basis of the light receiving signal, and a scanning part which causes the detection light to perform scanning in the circumferential direction around a rotation axis. Sensing of an intruder is performed by identifying the position of an object from the distance to the object and a scanning angle of the detection light and checking the identified position against a protection area.

Setting data which includes area designation information designating the protection area and measurement setting information designating a measurement condition is created using a setting support device. An information processing terminal such as a personal computer is used as the setting support device. The setting support device is capable of acquiring distance measurement information from the safety scanner and displaying the acquired distance measurement information on a screen. For example, in the setting support device, a scan image is displayed which includes a plurality of distance measurement information items obtained by performing scanning with the detection light, the plurality of distance measurement information items being represented as a plurality of distance measurement positions on a scanning plane of the detection light. Many distance measurement information items can be promptly grasped by displaying such a scan image.

However, in a conventional optical safety system, in order to check whether or not sensing of an intruder is appropriately performed with a protection area which is designated using the setting support device, it is necessary for the safety scanner to acquire distance measurement information after area designation information is transmitted to the safety scanner and setting data held by the safety scanner is updated. Thus, an editing operation for area designation information is disadvantageously troublesome.

SUMMARY OF THE INVENTION

The present invention has been made in view of the above circumstances, and an object thereof is to provide an optical safety system that enables simplification of an editing operation for area designation information.

According to one embodiment of the invention, an optical safety system includes a safety scanner that senses an intruder within a protection area and outputs a sensing signal and a setting support device that generates area designation information designating the protection area. The safety scanner includes an area designation information receiving section that receives the area designation information from the setting support device; a light emitting section that emits detection light to a detection area; a light receiving section that receives reflected light from an object within the detection area and generates a light receiving signal; a distance calculation section that obtains a distance to the object on the basis of the light receiving signal; a scanning section that causes the detection light to perform scanning in a circumferential direction around a rotation axis; a distance measurement section that obtains distance measurement information corresponding to the distance and a scanning angle of the detection light; and an intrusion sensing section that determines the presence or absence of an intruder into the protection area on the basis of area designation information received from the setting support device and distance measurement information obtained by the distance measurement section and outputs a sensing signal corresponding to the determination result. The setting support device includes an edit screen display section that displays an edit screen for creating the area designation information; an area designation information generation section that generates the area designation information; a distance measurement information receiving section that receives the distance measurement information from the safety scanner; and a pseudo determination information generation section that determines the presence or absence of an intruder into the protection area on the basis of the area designation information before being transmitted to the safety scanner and distance measurement information received from the safety scanner and generates pseudo determination information indicating the determination result. The edit screen display section displays a determination result corresponding to the pseudo determination information on the edit screen.

According to such a configuration, the pseudo determination information is generated by determining the presence or absence of an intruder into the protection area on the basis of the area designation information before being transmitted to the safety scanner and the distance measurement information received from the safety scanner and displayed on the edit screen. Thus, it is possible to check whether or not sensing of an intruder is appropriately performed with the protection area which is designated using the setting support device on the basis of the pseudo determination information without transmitting the area designation information to the safety scanner.

According to another embodiment of the invention, in the optical safety system, in addition to the above configuration, the safety scanner further includes an indicator lamp that indicates an output state of the sensing signal; a pseudo determination information receiving section that receives the pseudo determination information from the setting support device; and an indicator lamp control section that controls lighting of the indicator lamp and indicates a determination result corresponding to pseudo determination information received from the setting support device.

According to such a configuration, the safety scanner indicates the determination result corresponding to the pseudo determination information received from the setting support device. Thus, it is possible to check whether or not sensing of an intruder is appropriately performed with the protection area which is designated using the setting support device using the indicator lamp of the safety scanner.

According to still another embodiment of the invention, in the optical safety system, in addition to the above configuration, the indicator lamp control section performs indication of the determination result corresponding to the pseudo determination information distinguishably from an output state of the sensing signal during a period of receiving the pseudo determination information. According to such a configuration, it is possible to easily identify whether the indicator lamp indicates an output state of the sensing signal or indicates the pseudo determination information.

According to still another embodiment of the invention, in the optical safety system, in addition to the above configuration, the intrusion sensing section continues output of a sensing signal corresponding to area designation information received from the setting support device even during the period of receiving the pseudo determination information. According to such a configuration, even when the safety scanner operates on the basis of setting data, it is possible to check whether or not sensing of an intruder is appropriately performed based on the area designation information which is created using the setting support device is appropriately performed using the indicator lamp of the safety scanner.

According to still another embodiment of the invention, in the optical safety system, in addition to the above configuration, the intrusion sensing section outputs a sensing signal corresponding to the presence of an intruder during the period of receiving the pseudo determination information. According to such a configuration, it is possible to prevent an output state of the sensing signal from being switched during the creation of area designation information.

According to still another embodiment of the invention, in the optical safety system, in addition to the above configuration, the setting support device further includes a position designation section that designates a position on a scanning plane of the detection light in accordance with a user operation, the edit screen display section displays the scanning plane on the edit screen and displays a distance measurement position corresponding to distance measurement information received from the safety scanner and a position designated by the position designation section on the scanning plane, and the area designation information generation section generates the area designation information on the basis of a position designated by the position designation section. According to such a configuration, a user can create the area designation information merely by designating the position on the scanning plane while checking the distance measurement position.

According to still another embodiment of the invention, in the optical safety system, in addition to the above configuration, the safety scanner further includes a marker identification section that identifies a maker movably disposed within the detection area and an area generation information transmission section that transmits distance measurement information of the marker to the setting support device as area generation information for determining the protection area, the edit screen display section displays a scanning plane of the detection light on the edit screen and displays a distance measurement position corresponding to the distance measurement information of the marker on the scanning plane, and the area designation information generation section generates the area designation information on the basis of the distance measurement information of the marker.

According to such a configuration, the marker within the detection area is identified, and the distance measurement information thereof is displayed on the scanning plane. Thus, the correspondence relationship between the distance measurement position on the scanning plane and the real space can be easily grasped from the position of the marker in the detection area. Further, the area designation information is automatically generated using the distance measurement information of the marker. Thus, an operation of creating setting data can be simplified.

According to still another embodiment of the invention, in the optical safety system, in addition to the above configuration, the area designation information generation section generates the area designation information on the basis of a plurality of distance measurement information items obtained within a scanning period of the detection light. According to such a configuration, the area designation information is automatically generated using the plurality of distance measurement information items obtained within the scanning period. Thus, an operation of creating setting data can be simplified.

According to the present invention, it is possible to check whether or not sensing of an intruder is appropriately performed with the protection area which is designated using the setting support device on the basis of the pseudo determination information on the edit screen without transmitting the area designation information to the safety scanner. Thus, it is possible to provide the optical safety system that simplifies an editing operation for area designation information.

BRIEF DESCRIPTION OF THE DRAWINGS

FIG. 6 is a diagram illustrating an example of the operation of the setting support device of FIG. 5 and illustrates an edit screen displayed on a display;

DETAILED DESCRIPTION OF PREFERRED EMBODIMENT

First, a schematic configuration of an optical safety system as a premise of the present invention will be described below with reference to FIGS. 1 and 2.

<Optical Safety System 1>

Figure 1:
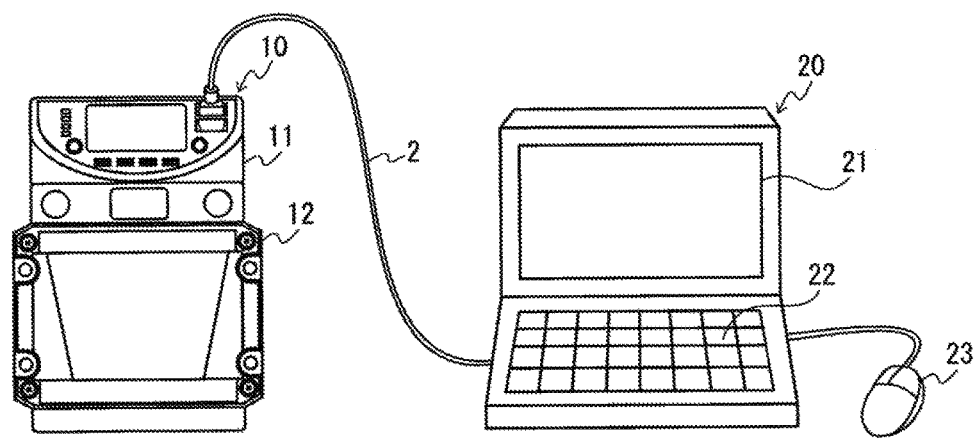
FIG. 1 is a system diagram illustrating a configuration example of an optical safety system according to an embodiment of the present invention.

FIG. 1 is a system diagram illustrating a configuration example of an optical safety system 1 according to an embodiment of the present invention. The optical safety system 1 includes the safety scanner 10 which senses an intruder within a protection area and outputs a sensing signal, and a setting support device 20 which generates setting data for the safety scanner. The safety scanner 10 and the setting support device 20 are connected to each other through a communication cable 2.

The sensing signal is a safety control signal for emergently stopping a machine such as a machine tool or an industrial robot. The sensing signal is output to a safety control device (not illustrated) which controls the machine, for example, to a programmable logic controller (PLC). The operation of a machine as a control target of the safety control device can be stopped by switching an output state of the sensing signal to an off state.

The protection area is a monitoring target area of intruder sensing. For example, an area around machinery and equipment such as a work area of a machine tool or an industrial robot or a moving area of a conveyance vehicle is designated as the protection area.

The safety scanner 10 is an optical scanning safety sensor which optically senses an intruder within the protection area, and includes a display unit 11 and a measurement unit 12. The display unit 11 is a user interface which receives a user operation and displays, for example, an operating state and setting data and provided with a connection port for the communication cable 2 and an output port for a safety control signal.

The measurement unit 12 is a sensor head unit which emits detection light to a detection area and receives reflected light from an object within the detection area to sense an intruder. The detection area is the largest area detectable by the measurement unit 12. The protection area is an area designated within the detection area. The measurement unit 12 is provided with a rotary optical system which causes detection light to perform scanning in the circumferential direction around a rotation axis and a camera which captures an image of the detection area to generate a camera image.

A warning area can be set to the safety scanner 10 in addition to the protection area. When the safety scanner 10 senses an intruder within the warning area, the safety scanner 10 outputs an auxiliary output signal and performs user notification by, for example, lighting an indicator lamp.

For example, the measurement unit 12 is placed on a horizontal floor surface. The display unit 11 includes an output signal switching device (OSSD). When no intruder is present within the protection area, the OSSD is in an on state, and a sensing signal of an on state is output. On the other hand, when an intruder is present within the protection area, the OSSD is in an off state, and a sensing signal of an off state is output.

The setting support device 20 is an information processing terminal, for example, a personal computer which is provided with a display 21, a keyboard 22, and a mouse 23. For example, the setting support device 20 creates setting data for designating the protection area and a measurement condition. The setting data includes area designation information for designating the protection area and measurement setting information for designating the measurement condition. Further, the setting support device 20 performs an operation of acquiring distance measurement information and a camera image from the safety scanner 10 and displaying the acquired information and image on the display 21.

For example, the setting support device 20 can be achieved by operating a computer in accordance with a setting support program for the safety scanner. Such a setting support program is recorded in a computer readable recording medium such as a CO-ROM to be provided or provided through a network.

<Safety Scanner 10>

Figure 2:
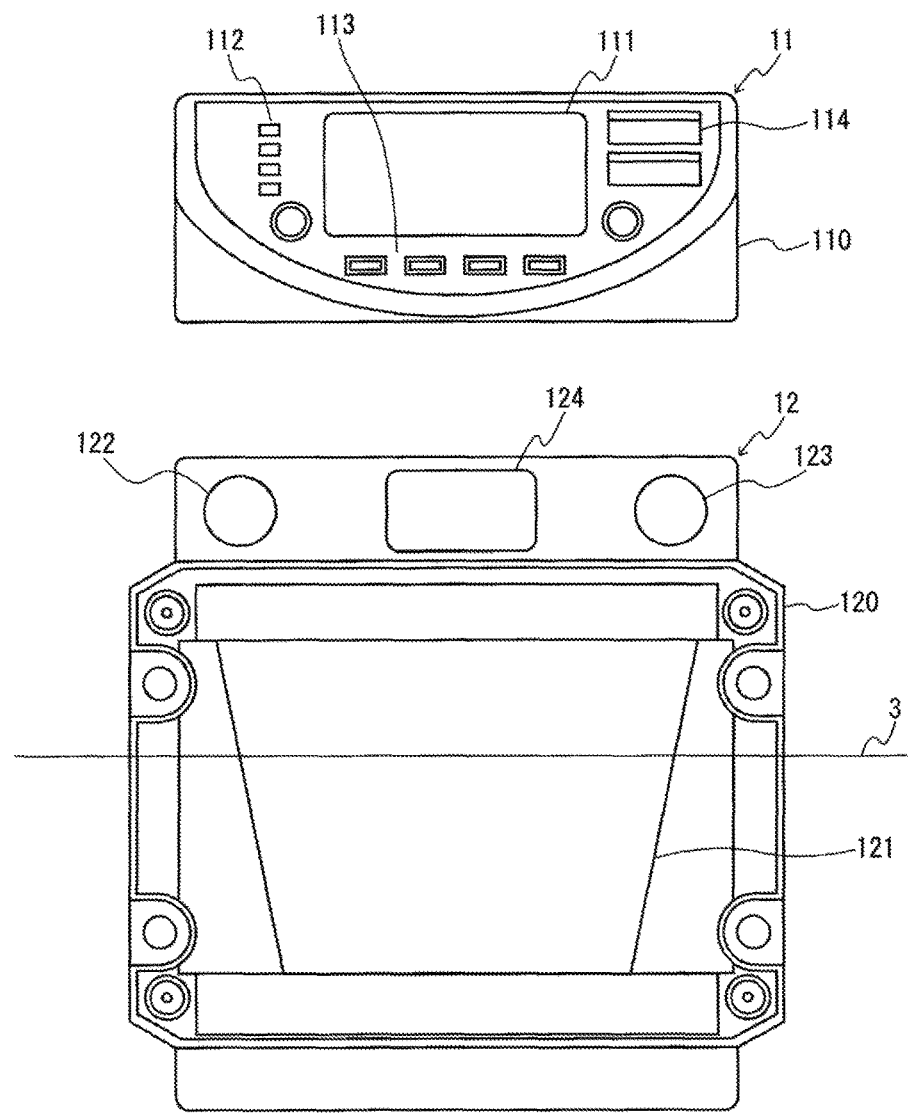
FIG. 2 is a diagram illustrating a configuration example of a safety scanner of FIG. 1.

FIG. 2 is a diagram illustrating a configuration example of the safety scanner 10 of FIG. 1 and illustrates a separate type safety sensor which includes the display unit 11 separable from the measurement unit 12. FIG. 2 illustrates the safety scanner 10 viewed from the front side. The display unit 11 and the measurement unit 12 are connected to each other through a wiring cable (not illustrated). Two or more measurement units 12 can be connected to the display unit 11 at the same time.

A scanner casing 120 of the measurement unit 12 houses the rotary optical system which emits detection light in the horizontal direction and causes the detection light to perform scanning along a horizontal scanning plane 3, and a protective cover 121 for protecting the rotary optical system is attached to a housing part for the rotary optical system. The scanning plane 3 is a plane perpendicular to the rotation axis of the rotary optical system.

For example, laser light having a wavelength in an infrared range is used as the detection light. The detection light repeatedly performs scanning at a constant scanning period. The scanner casing 120 is provided with two fixed cameras 122 and 123, and an indicator lamp 124 which indicates an output state of the sensing signal. The fixed cameras 122, 123 and the indicator lamp 124 are disposed above the housing part for the rotary optical system.

Both the fixed cameras 122 and 123 are imaging devices which capture an image of the detection area to generate a camera image and disposed with different orientations. The fixed camera 122 is disposed on the left side with respect to the indicator lamp 124 when viewed from the side facing the measurement unit 12. On the other hand, the fixed camera 123 is disposed on the right side with respect to the indicator lamp 124 when viewed from the side facing the measurement unit 12. That is, the fixed cameras 122 and 123 are disposed at different positions in the circumferential direction with respect to the rotation axis of the rotary optical system. The fixed camera 122 is a camera whose angle of view includes a right side area with respect to the front-rear direction viewed from the measurement unit 12, and the fixed camera 123 is a camera whose angle of view includes a left side area with respect to the front-rear direction viewed from the measurement unit 12. The fixed cameras 122 and 123 are disposed above the scanning plane 3 and thus capable of obtaining a camera image of a bird's eye view of the scanning plane 3.

The fixed cameras 122 and 123 preferably capture not only an image of the protection area, but also an image of the periphery of the protection area. More preferably, the fixed cameras 122 and 123 capture images of an area settable as the warning area and the periphery thereof.

The indicator lamp 124 is an LED indicator which indicates an output state and an operating state of the sensing signal. The indicator lamp 124 is lit in different colors according to the output state of the sensing signal. For example, the indicator lamp 124 is lit in red when the OSSD is in an off state and lit in green when the OSSD is in an on state.

The display unit 11 is disposed on the upper face of the measurement unit 12. The display casing 110 of the display unit 11 is provided with a display panel 111, an indicator lamp 112, an operation key 113, and a cable connection port 114.

The display panel 111 is a display device which screen-displays, for example, an operating state, distance measurement information, a camera image, and setting data. For example, the display panel 111 is a liquid crystal display (LCD) panel. The indicator lamp 112 is an LED indicator for indicating, for example, an operating state and an output state of the sensing signal. The display unit 11 communicates with the measurement unit 12 and is capable of checking an operating state and a sensing history of an intruder even when placed at a position away from the measurement unit 12. The cable connection port 114 is an input/output terminal part to which the communication cable 2 is detachably connected.

Next, a more detailed configuration of the optical safety system 1 according to the present invention will be described below with reference to FIGS. 3 to 10.

<Measurement Unit 12>

Figure 3:
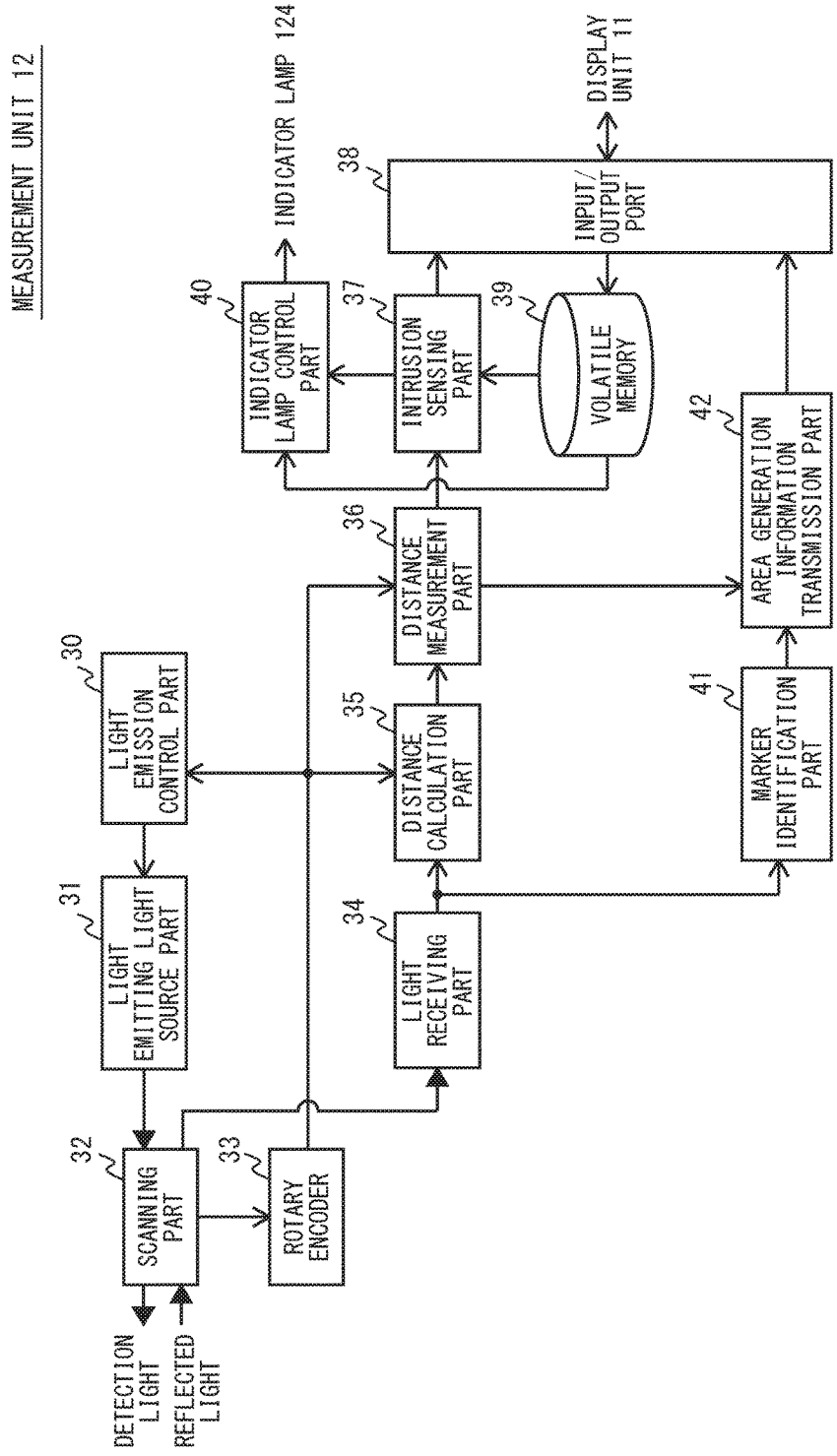
FIG. 3 is a block diagram illustrating an example of a functional configuration in a measurement unit of FIG. 2.

FIG. 3 is a block diagram illustrating an example of a functional configuration in the measurement unit 12 of FIG. 2. The measurement unit 12 includes a light emission control part 30, a light emitting light source part 31, a scanning part 32, a rotary encoder 33, a light receiving part 34, a distance calculation part 35, a distance measurement part 36, an intrusion sensing part 37, an input/output port 38, a volatile memory 39, an indicator lamp control part 40, a marker identification part 41, and an area generation information transmission part 42.

The light emitting light source part 31 includes a light emitting element such as a laser diode (LD) or a light emitting diode (LED) and generates detection light. The light emission control part 30 controls the light emitting light source part 31 so that the light emitting light source part 31 generates pulse-like detection light at a constant time interval. The scanning part 32 includes the rotary optical system which emits the detection light toward an object and causes the detection light to perform scanning in the circumferential direction around the rotation axis and a drive part which rotates the rotary optical system around the rotation axis. For example, the rotary optical system of the scanning part 32 includes an emitter mirror which reflects the detection light toward an object, a receiver lens which receives reflected light from the object, and a receiver mirror which reflects the reflected light transmitted through the receiver lens toward a light receiving element.

The light receiving part 34 includes a light receiving element such as a photodiode (PD), and receives reflected light from an object and generates a light receiving signal. The rotary encoder 33 is a rotation detection device which detects a rotation of the rotary optical system and generates a pulse signal whose pulse repetition interval corresponds to a rotation speed. The light emission control part 30 controls the light emitting light source part 31 on the basis of the pulse signal of the rotary encoder 33 to adjust an emission timing of the detection light. For example, every time the rotary optical system of the scanning part 32 rotates by 360/1000°, the detection light is emitted.

The distance calculation part 35 obtains a distance to the object on the basis of the light receiving signal from the light receiving part 34. The distance calculation part 35 is a measurement part which performs distance measurement by a time of flight (TOF) system. The distance calculation part 35 measures a receiving timing of the light receiving signal on the basis of the timing of the pulse signal of the rotary encoder 33 and identifies a delay time between when detection light is emitted and when reflected light corresponding to the detection light is received to calculate the distance to the object as a detection distance. The distance measurement part 36 obtains distance measurement information corresponding to the detection distance obtained by the distance calculation part 35 and a scanning angle of the detection light.

The intrusion sensing part 37 determines the presence or absence of an intruder into the protection area on the basis of area designation information which is received from the setting support device 20 and stored in the volatile memory 39 and distance measurement information obtained by the distance measurement part 36, and outputs a sensing signal corresponding to the determination result. The scanning angle of the detection light is identified on the basis of the pulse signal of the rotary encoder 33. Further, whether or not an intruder is present within the protection area is determined by identifying a two-dimensional position of the intruder from the detection distance and the scanning angle of the detection light and checking the identified two-dimensional position against positional information of the protection area. The sensing signal is transmitted to the display unit 11 through the input/output port 38.

The input/output port 38 is a communication interface part which communicates with the display unit 11. The input/output port 38 receives setting data which includes area designation information and pseudo determination information (described below) from the display unit 11 and transmits an operating state, distance measurement information, a sensing signal, a scan image, and a camera image to the display unit 11. The pseudo determination information is information indicating a determination result of an intruder and created by the setting support device 20.

The volatile memory 39 is a volatile storage element incorporated in the measurement unit 12. The volatile memory 39 holds setting data and pseudo determination information which are received from the display unit 11. The distance measurement information is repeatedly transmitted to the display unit 11 and the setting support device 20 at a constant time interval. For example, every time scanning with the detection light is performed by a certain angle, the distance measurement information is transmitted.

The indicator lamp control part 40 controls lighting of the indicator lamp 124. The indicator lamp control part 40 indicates an output state of the sensing signal or a determination result corresponding to pseudo determination information by lighting the indicator lamp 124. The pseudo determination information used in lighting control is received from the setting support device 20 and stored in the volatile memory 39.

The indicator lamp control part 40 performs indication of a determination result corresponding to the pseudo determination information distinguishably from an output state of the sensing signal during a period of receiving the pseudo determination information. The intrusion sensing part 37 continues output of a sensing signal corresponding to area designation information received from the setting support device 20 even during the period of receiving the pseudo determination information. Note that the intrusion sensing part 37 may output a sensing signal corresponding to the presence of an intruder, that is, a sensing signal of an off state during the period of receiving the pseudo determination information.

The marker identification part 41 identifies a marker which is movably disposed within the detection area, and outputs the identification result to the area generation information transmission part 42. The marker is a position designation object which is disposed within the detection area for designating the protection area. The marker identification part 41 identifies a receiving amount of reflected light from a light receiving signal of the light receiving part 34, and identifies the marker on the basis of the light receiving amount. For example, the receiving amount of the reflected light is compared with a light amount threshold for determination, and the marker is identified according to the comparison result.

The area generation information transmission part 42 transmits distance measurement information of the marker to the setting support device 20 as area generation information for determining the protection area. For example, the area generation information transmission part 42 transmits distance measurement information of the marker in a temporarily stopped state. The area generation information including the distance measurement information of the marker is transmitted to the display unit 11 through the input/output port 38.

Although there is described an example of the safety scanner 10 in which one measurement unit 12 is connected to one display unit 11, a configuration in which a plurality of measurement units 12 can be connected to one display unit 11 may be employed. In this case, the OSSD of the display unit 11 is turned on when all the target measurement units 12 confirm that the OSSD should be turned on in the respective protection areas, and turned off in the other cases.

<Display Unit 11>

Figure 4:
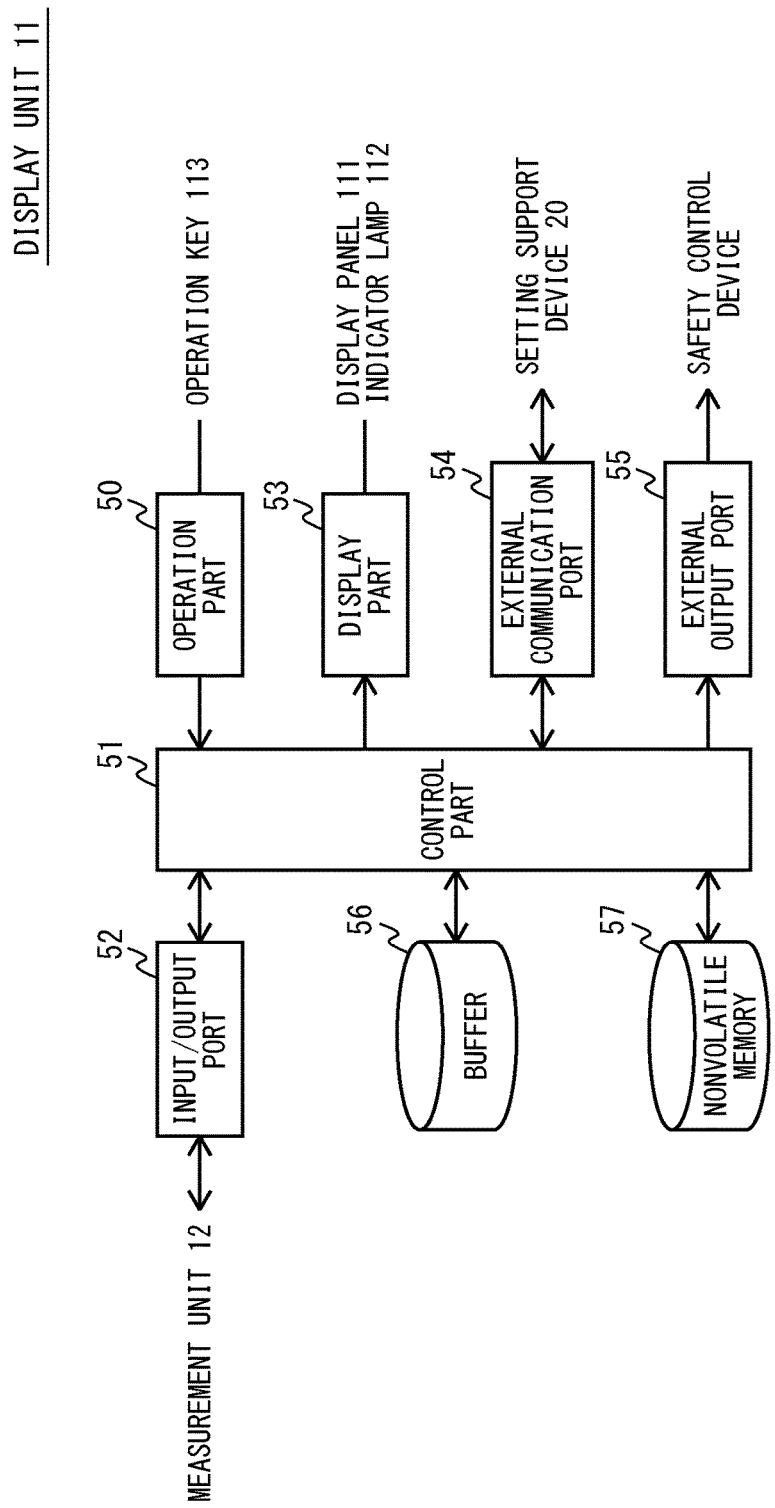
FIG. 4 is a block diagram illustrating an example of a functional configuration in a display unit of FIG. 2.

FIG. 4 is a block diagram illustrating an example of a functional configuration in the display unit 11 of FIG. 2. The display unit 11 includes an operation part 50, a control part 51, an input/output port 52, a display part 53, an external communication port 54, an external output port 55, buffer 56, and a nonvolatile memory 57.

The input/output port 52 is a communication interface part which communicates with the measurement unit 12, and transmits setting data and pseudo determination information to the measurement unit 12 and receives an operating state, distance measurement information, a sensing signal, a scan image, and a camera image from the measurement unit 12.

The external communication port 54 is a communication interface part which communicates with the setting support device 20, and receives setting data and pseudo determination information from the setting support device 20 and transmits an operating state, distance measurement information, a scan image, and a camera image to the setting support device 20. The external output port 55 is an interface part which outputs an output signal (an on state or an off state) of the OSSD to the safety control device as a sensing signal (safety control signal). Note that the external output port 55 may be configured to transmit an output signal (an on state or an off state) of the OSSD to the safety control device as a sensing signal (safety control signal) by two-way communication with the safety control device.

The operation part 50 generates an operation signal in accordance with a depression operation of the operation key 113 and outputs the operation signal to the control part 51. The display part 53 drives the display panel 111 and the indicator lamp 112 to display setting data, an operating state, distance measurement information, a scan image, and a camera image on the display panel 111 and indicates an operating state on the indicator lamp 112.

The display part 53 is a monitoring image display section which displays an output state of the sensing signal, a scan image, or a camera image on a monitor screen. The display part 53 displays the protection area on the scan image. When the operation part 50 receives a switching instruction by an operation of the operation key 113, the display part 53 switches a display image between the scan image and the camera image in accordance with the switching instruction. Further, the display part 53 displays a plurality of distance measurement positions on the camera image.

The control part 51 acquires distance measurement information, a scan image, and a camera image from the measurement unit 12 through the input/output port 52, and stores the acquired information and images in the buffer 56. When data accumulated in the buffer 56 exceeds a certain amount, the control part 51 overwrites the oldest data and stores new data. The buffer 56 is a volatile storage element for temporary recording which is incorporated in the safety scanner 10.

Further, the control part 51 acquires sensing information of an intruder from the measurement unit 12 and generates a sensing history on the basis of the sensing information. The sensing history includes a position of the sensed intruder (sensing position), a time when the intruder is sensed (sensing time), and monitoring moving images (a camera image and a scan image) whose acquisition period includes the sensing time, and these sensing information items are associated with each other and stored as the sensing history.

The nonvolatile memory 57 is a nonvolatile storage element incorporated in the safety scanner 10. The nonvolatile memory 57 holds setting data and pseudo determination information which are acquired from the setting support device 20 and a sensing history which is created by the control part 51.

When the input/output port 52 receives a capture signal by sensing of an intruder, the control part 51 reads monitoring moving images (a scan image and a camera image) in the buffer 56 in accordance with the capture signal and stores the acquired images in the nonvolatile memory 57 as history information.

The nonvolatile memory 57 holds only the newest setting data as recording data. When new setting data is acquired from the setting support device 20, the setting data in the nonvolatile memory 47 is updated by the acquired setting data. When the setting data in the nonvolatile memory 47 is updated, the updated setting data is transmitted to the measurement unit 12.

<Setting Support Device 20>

Figure 5:
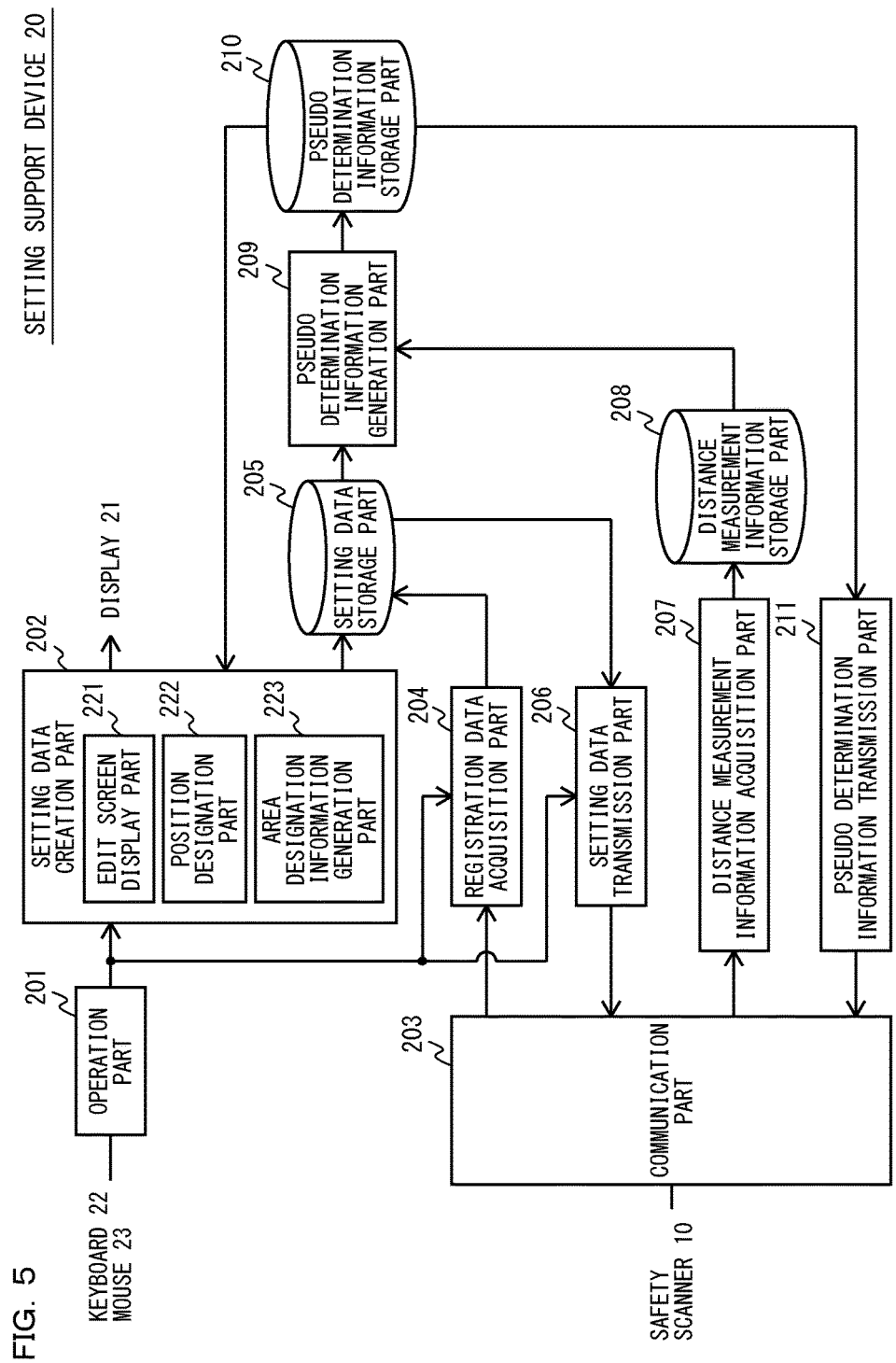
FIG. 5 is a block diagram illustrating an example of a functional configuration in a setting support device of FIG. 1.

FIG. 5 is a block diagram illustrating an example of a functional configuration in the setting support device 20 of FIG. 1. The setting support device 20 includes an operation part 201, a setting data creation part 202, a communication part 203, a registration data acquisition part 204, a setting data storage part 205, a setting data transmission part 206, a distance measurement information acquisition part 207, a distance measurement information storage part 208, a pseudo determination information generation part 209, a pseudo determination information storage part 210, and a pseudo determination information transmission part 211.

The operation part 201 generates an operation signal in accordance with an operation of the keyboard 22 or the mouse 23, and outputs the operation signal to the setting data creation part 202, the registration data acquisition part 204, and the setting data transmission part 206. The communication part 203 is an interface part which communicates with the display unit 11 of the safety scanner 10, and transmits setting data to the safety scanner 10 and receives an operating state, distance measurement information, a scan image, a camera image, and a sensing history from the safety scanner 10.

The setting data creation part 202 creates setting data and stores the created setting data in the setting data storage part 205. The setting data includes area designation information for designating the protection area and measurement setting information for designating the measurement condition. For example, the area designation information is created by designating the position, shape, or size of the protection area on the scanning plane 3. On the other hand, the measurement setting information is created by designating a response speed, the size of an intruder to be a sensing target, a scanning period, or a resolving power.

The setting data creation part 202 includes an edit screen display part 221, a position designation part 222, and an area designation information generation part 223. The edit screen display part 221 drives the display 21 to display an edit screen for creating area designation information on the display 21.

A scan image is displayed on the edit screen. The scan image is formed by two-dimensionally displaying a plurality of distance measurement information items obtained within a scanning period of the detection light. Each of the distance measurement information items is represented as a distance measurement position on the scanning plane 3 identified by the scanning angle and the detection distance. That is, the scan image is a monitoring image in which two-dimensional positions corresponding to the distance measurement information items are indicated on a plane corresponding to the scanning plane 3. For example, the scan image is a moving image which is created on the basis of distance measurement information which is acquired at the time of receiving reflected light and updated synchronously with the scanning period of the detection light.

The position designation part 222 designates a position on the scanning plane 3 in accordance with a user operation. The edit screen display part 221 displays the scanning plane 3 on the edit screen, and displays a distance measurement position corresponding to distance measurement information received from the safety scanner 10 and the position designated by the position designation part 222 on the scanning plane 3.

The area designation information generation part 223 generates area designation information on the basis of the position designated by the position designation part 222. The scan image which is formed of a distance measurement line which chronologically connects a plurality of distance measurement positions obtained within the scanning period of the detection light is displayed on the edit screen. A user designates a position on the scan image. For example, a plurality of positions are sequentially designated along the boundary of a desired area, so that an area including, as a part of the boundary thereof, a polygonal line which chronologically connects these positions is designated as the protection area.

The registration data acquisition part 204 acquires registration data from the safety scanner 10 through the communication part 203 in accordance with a capture instruction by a user operation, and stores the acquired registration data in the setting data storage part 205. The setting data creation part 202 is capable of creating new setting data by changing the registration data acquired from the safety scanner 10. The setting data transmission part 206 reads setting data from the setting data storage part 205 in accordance with a transfer instruction by a user operation, and transmits the read setting data to the safety scanner 10 through the communication part 203.

The distance measurement information acquisition part 207 acquires distance measurement information from the safety scanner 10 through the communication part 203, and stores the acquired distance measurement information in the distance measurement information storage part 208. The pseudo determination information generation part 209 determines the presence or absence of an intruder into the protection area on the basis of area designation information before being transmitted to the safety scanner 10 and distance measurement information which is received from the safety scanner 10 and stored in the distance measurement information storage part 208, and generates pseudo determination information indicating the determination result.

The determination of an intruder is performed by identifying a two-dimensional position of the intruder from distance measurement information, and comparing and checking the identified two-dimensional position against positional information of the protection area. The pseudo determination information storage part 210 holds pseudo determination information. For example, the pseudo determination information in the pseudo determination information storage part 210 is updated every time new distance measurement information is acquired.

The edit screen display part 221 displays a determination result corresponding to pseudo determination information in the pseudo determination information storage part 210 on the edit screen. The pseudo determination information transmission part 211 reads pseudo determination information from the pseudo determination information storage part 210, and transmits the read pseudo determination information to the safety scanner 10 through the communication part 203. The pseudo determination information is repeatedly transmitted to the safety scanner 10 at a constant time interval. For example, every time new distance measurement information is acquired, the pseudo determination information is transmitted.

In the optical safety system 1, the area designation information may be created using a real drawing function or an automatic drawing function. The real drawing function is a function of designating the protection area by moving a marker along the outer edge of the area. On the other hand, the automatic drawing function is a function of automatically designating the protection area using the current distance measurement information.

When the real drawing function is selected, the edit screen display part 221 displays the scanning plane 3 on the edit screen and displays a distance measurement position corresponding to distance measurement information of the marker on the scanning plane 3. The area designation information generation part 223 generates area designation information on the basis of the distance measurement information of the marker.

When the automatic drawing function is selected, the area designation information generation part 223 generates area designation information on the basis of a plurality of distance measurement information items obtained within the scanning period of the detection light. When the automatic drawing function is used, an area which includes, as a part of the boundary thereof, a polygonal line extending along the distance measurement line of the scan image is automatically designated as the protection area closer to the measurement unit 12 than the distance measurement line.

<Edit Screen 6>

FIG. 6 is a diagram illustrating an example of the operation of the setting support device 20 of FIG. 5 and illustrates an edit screen 6 which is displayed on the display 21. The edit screen 6 is a system screen for creating setting data and displayed on the display 21.

The edit screen 6 includes an image display region 60, a setting tab 61, a monitor tab 62, a sensing history tab 63, and a display target selection tab 64. The current scan image is displayed in the image display region 60.

The scan image is a line image formed of a distance measurement line 71 which connects a plurality of distance measurement positions obtained within the scanning period of the detection light and updated at a constant frame rate corresponding to the scanning period of the detection light. The distance measurement line 71 is a figure representing the boundary of the detection area and includes a polygonal line which chronologically connects a plurality of sequentially acquired distance measurement positions. The current state around the measurement unit 12 can be grasped by watching the scan image.

In this example, the scan image is drawn with the upper direction of the edit screen 6 aligned with the front direction of the measurement unit 12. Orthogonal coordinate axes 72 which include the measurement unit 12 as an origin point, a y axis aligned with the front-rear direction, and an x axis aligned with the right-left direction are indicated on the scan image. Grid lines 73 and 74 which are parallel to the coordinate axes are displayed on the scan image.

The setting tab 61 is an operation icon for selecting a setting data creation function. The monitor tab 62 is an operation icon for displaying the current scan image or camera image in the image display region 60. The sensing history tab 63 is an operation icon for displaying a sensing history.

In this example, the setting tab 61 is selected, and a sub panel is disposed on the left side with respect to the image display region 60. The sub panel includes menu item buttons 65 to 68 for setting the operation of the safety scanner 10 and a readout button 69.

The display target selection tab 64 is an operation icon for selecting the measurement unit 12 to be displayed. When a plurality of measurement units 12 are coupled to the display unit 11 which is connected to the setting support device 20, any of the measurement units 12 can be selected as a display target, and the corresponding camera image or scan image can be displayed in the image display region 60 by operating the display target selection tab 64. In this example, a measurement unit "HEAD 1" is selected as a display target, and the corresponding scan image is displayed.

The menu item button 65 is an operation icon for designating a unit configuration of the safety scanner 10. The menu item button 66 is an operation icon for designating the measurement condition of the safety scanner 10. The menu item button 67 is an operation icon for designating the protection area. The menu item button 68 is an operation icon for transmitting setting data to the safety scanner 10. In this example, the menu item button 67 is selected. The readout button 69 is an operation icon for acquiring registration data from the safety scanner 10.

The edit screen 6 includes a simulation button 70 for simulating intruder sensing using area designation information before being transmitted to the safety scanner 10 and distance measurement information acquired from the safety scanner 10. The presence or absence of an intruder into the protection area is determined on the basis of setting data being edited and distance measurement information acquired from the safety scanner 10, and the determination result is displayed on the edit screen by operating the simulation button 70.

Figure 7A:
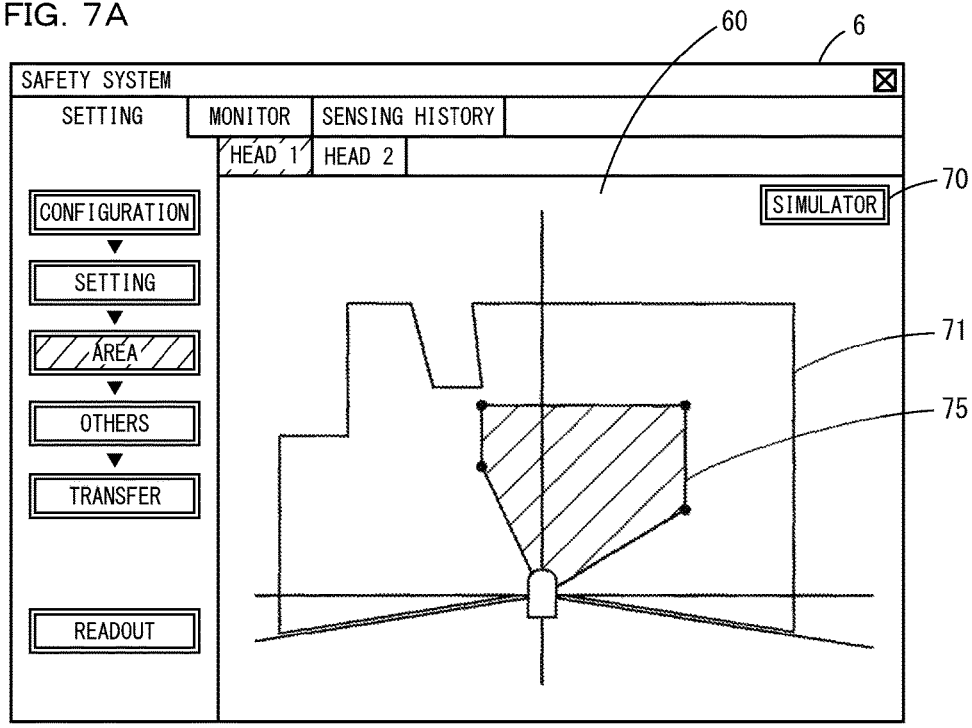
FIGS. 7A and 7B are diagrams illustrating an example of the operation of the setting support device of FIG. 5 and illustrate an edit screen which is displayed when a protection area is designated and a simulation button is operated.
Figure 7B:
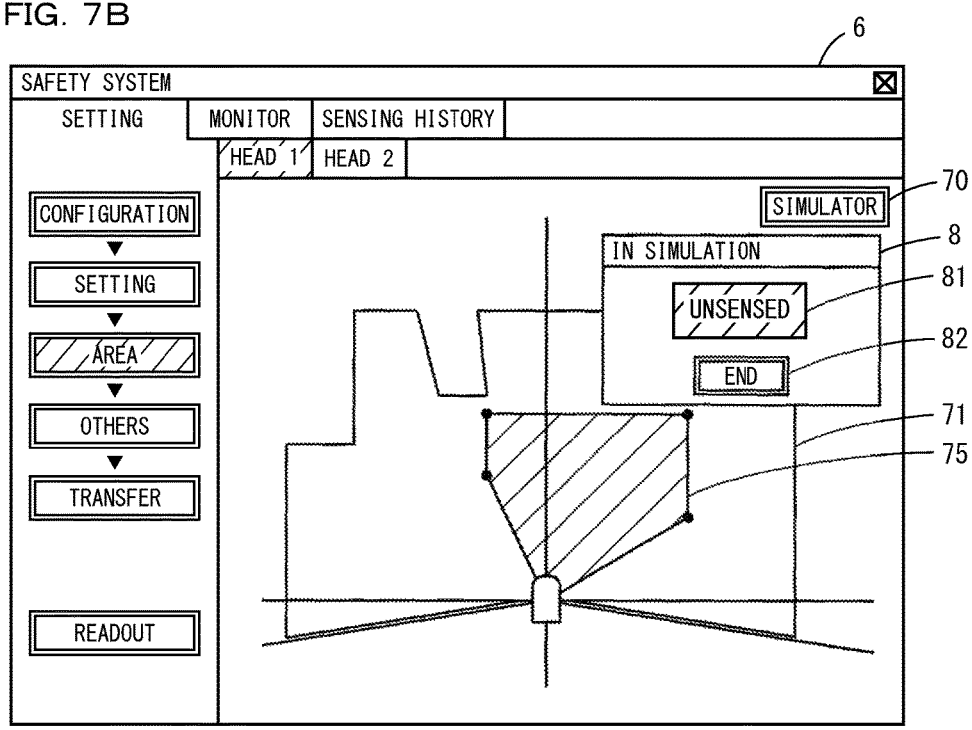

FIGS. 7A and 7B are diagrams illustrating an example of the operation of the setting support device 20 of FIG. 5 and illustrate the edit screen 6 which is displayed when the protection area 75 is designated and the simulation button 70 is operated. FIG. 7A illustrates the edit screen 6 which is displayed after the designation of the protection area 75.

The protection area 75 is designated by designating a position and a shape on the scanning plane 3 by operating the keyboard 22 or the mouse 23. For example, the positions of the vertexes of a polygonal area are sequentially designated by moving a mouse pointer by operating the mouse 23, so that an area including, as a part of the boundary thereof, a polygonal line which chronologically connects the vertexes is designated as the protection area. Such a configuration enables a user to create area designation information merely by designating the position on the scanning plane 3 while checking the distance measurement position.

FIG. 7B illustrates the edit screen 6 which is displayed after the operation of the simulation button 70. The presence or absence of an intruder into the protection area is determined on the basis of area designation information being edited, that is, area designation information before being transmitted to the safety scanner 10 and distance measurement information acquired from the safety scanner 10, and the determination result is displayed by operating the simulation button 70 in the edit screen 6.

In this example, a result check screen 8 for checking the determination result is displayed on the edit screen 6. The result check screen 8 includes a sensing state message 81 which indicates the determination result of an intruder and an end button 82 for ending a simulation mode. The result check screen 8 in this example displays a sensing state massage "UNSENSED" and shows that no intruder has been sensed.

The safety scanner 10 is in a simulation mode during a period between when the simulation button 70 is operated and when the end button 82 is operated. During this period, a determination result corresponding to pseudo determination information is indicated distinguishably from an output state of the sensing signal by lighting the indicator lamp 124.

For example, the indicator lamp 124 is lit in green when an output state of the sensing signal is in an on state (unsensed state) and lit in red when an output state of the sensing signal is in an off state (sensed state). On the other hand, in the simulation mode, the indicator lamp 124 flashes in green when the pseudo determination information is in an on state (unsensed state) and flashes in red when the pseudo determination information is in an off state (sensed state).

The safety scanner 10 indicates the determination result corresponding to the pseudo determination information received from the setting support device 20. Thus, it is possible to check whether or not sensing of an intruder is appropriately performed with the protection area which is designated using the setting support device 20 using the indicator lamp 124 of the safety scanner 10. For example, a sensing state can be checked even at a position away from the setting support device 20.

In the optical safety system 1, an area marker designation function can be selected during the simulation mode. The area marker designation function is a function of automatically designating a monitoring target area by moving a marker along the outer edge of the area (real drawing function).

When an operation mode is the simulation mode, the output of the OSSD of the safety scanner 10 is forcibly controlled to an off state, or controlled to an on state or an off state on the basis of the currently set protection area. The indicator lamp 124 is lit according to a state of the OSSD output. For example, the indicator lamp 124 is lit in green when the OSSD output is in an on state and lit in red when the OSS output is in an off state. Note that green flashing and red flashing are switched according to pseudo determination information during the simulation mode.

When the safety scanner 10 senses the marker, the safety scanner 10 indicates that the marker has been sensed using the indicator lamp 124. For example, during the simulation mode, the indicator lamp 124 flashes in green or red according to the pseudo determination information. Then, when the area marker designation function is selected, and the safety scanner 10 senses the marker, the indicator lamp 124 is lit in orange for a certain time. The setting support device 20 acquires distance measurement information of the marker from the safety scanner 10 and updates the pseudo determination information on the basis of the acquired distance measurement information. The indicator lamp 124 is lit in orange for a certain time after the sensing of the marker, and then flashes in green or red according to the updated pseudo determination information. Note that the determination indication according to the pseudo determination information and the indication indicating that the marker has been sensed may be performed by the setting support device 20 instead of the indicator lamp 124. Alternatively, the determination indication according to the pseudo determination information and the indication indicating that the marker has been sensed may be performed by the setting support device 20 in addition to the indicator lamp 124.

Figure 8:
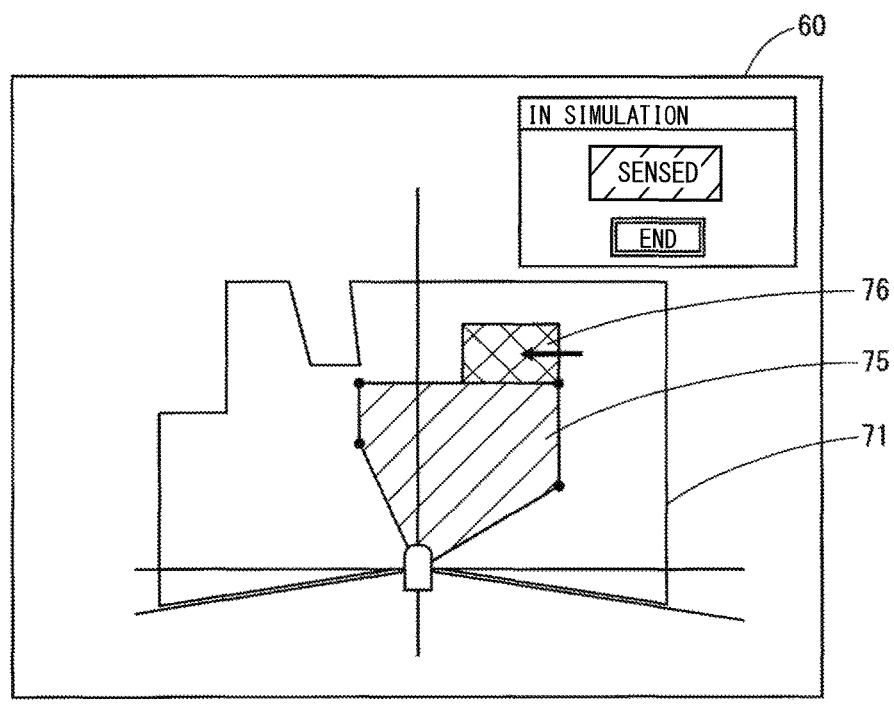
FIG. 8 is a diagram illustrating an example of the operation of the setting support device of FIG. 5 and illustrates a case in which an additional area is added to the protection area.

FIG. 8 is a diagram illustrating an example of the operation of the setting support device 20 of FIG. 5 and illustrates a simulation result which is obtained when an additional area 76 is added to the protection area 75. FIG. 8 illustrates a case in which a new area is added, as the additional area 76, to the protection area 75 which is registered as setting data in the safety scanner 10, and the simulation button 70 is then operated. The additional area 76 is a rectangular area which is adjacent to the protection area 75.

New area designation information is created by adding the additional area 76 to the protection area 75 registered in the safety scanner 10. While the new area designation information is transmitted to the safety scanner 10, the presence or absence of an intruder is determined with the original protection area 75 defined as a monitoring target, and a sensing signal corresponding to the determination result is output in the safety scanner 10.

On the other hand, in the setting support device 20, the presence or absence of an intruder is determined with an area including the protection area 75 and the additional area 76 defined as a monitoring target, and the determination result is displayed on the edit screen 6. In such a case, when an object is moved into the additional area 76 in a real space, the sensing state message 81 on the result check screen 8 changes from "UNSENSED" to "SENSED". It is possible to easily identify whether or not the area has been appropriately designated by checking such a change in the sensing state. Further, even when an object has mistakenly intruded into the protection area 75 when moved in a real space, an output state of the sensing signal is correctly switched to an off state.

Figure 9:
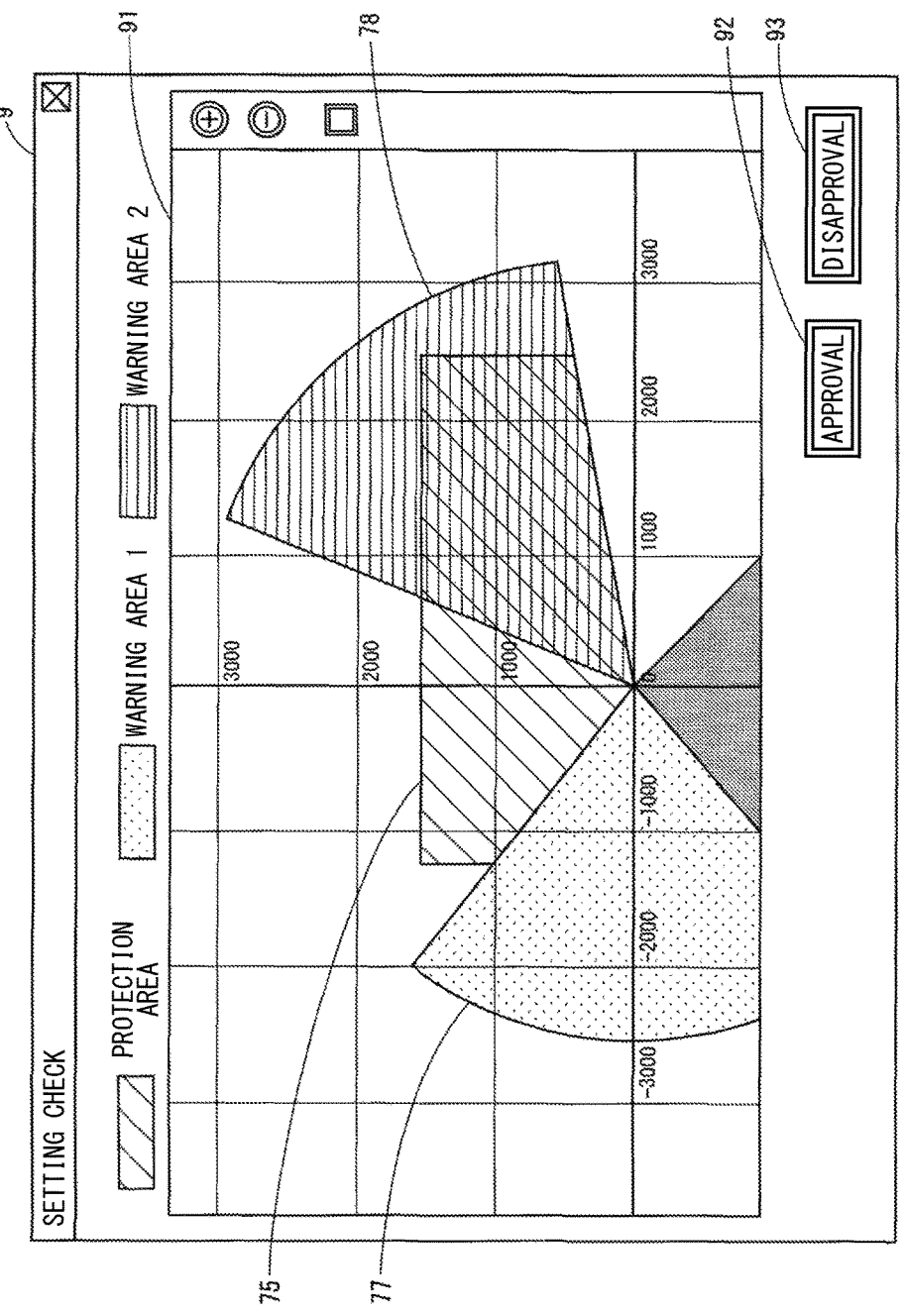
FIG. 9 a diagram illustrating an example of the operation of the setting support device of FIG. 5 and illustrates a setting check screen which is displayed after transmission of setting data.

FIG. 9 is a diagram illustrating an example of the operation of the setting support device 20 of FIG. 5 and illustrates a setting check screen 9 which is displayed after transmission of setting data. An operation procedure for updating setting data in the safety scanner 10 will be described below.

(1) Setting Data Transfer Step

In order to change the protection area 75, the protection area 75 is edited on the setting support device 20, and setting data that reflects the edit result is transferred from the setting support device 20 to the safety scanner 10 upon completion of an editing operation for the protection area 75.

For example, a confirmation dialog for confirming setting transfer is displayed by clicking a menu item button "SETTING TRANSFER" on the edit screen 6. The transfer of the setting data is started by clicking an OK button in the confirmation dialog. During the transfer of the setting data, a pop-up screen which indicates the progress of a transfer process (a process of writing the setting data into the safety scanner 10) is displayed on the edit screen 6.

(2) Setting Data Reading Step

In order to check whether or not the setting data has been correctly written into the safety scanner 10 after the transfer of the setting data, the setting data is read from the safety scanner 10 to the setting support device 20. The reading of the setting data is automatically started. During the reading of the setting data, a pop-up screen which indicates the progress of a reading process (a process of reading the setting data from the safety scanner 10) is displayed on the edit screen 6.

(3) Setting Data Check Step

When the setting data has been read from the safety scanner 10 to the setting support device 20, the setting check screen 9 for checking the protection area 75 written into the safety scanner 10 is displayed on the setting support device 20. The setting check screen 9 is a dialog screen for checking whether or not the monitoring target area such as the protection area 75 is correctly set and displayed on the display 21.

The setting check screen 9 includes an area display region 91 in which the monitoring target area is displayed on the scanning plane 3, an approval button 92, and a disapproval button 93. The monitoring target area includes the protection area 75 which relates to the OSSD output, and warning areas 77 and 78 each of which relates to user notification. In this example, the warning area 77 which is an area adjacent to the protection area 75 is designated. Further, the warning area 78 is an area which partially overlaps the protection area 75.

A user moves a test piece (detection object) on the boundary of the actual protection area 75 to check whether or not the protection area 75 is set at a desired position using, for example, the indicator lamp 124 of the safety scanner 10. When the tracing of the boundary of the protection area 75 with the test piece is finished, the approval button 92 and the disapproval button 93 on the setting check screen 9 become clickable.

(4) Setting Data Approval Step

When the user confirms that the protection area 75 is an intended area as a result of the checking of the protection area 75, the user clicks the approval button 92. The transferred setting data is reflected to the safety scanner 10 by operating the approval button 92, and the safety scanner 10 controls an on state or an off state of the OSSD output on the basis of the reflected setting contents.

On the other hand, when the user confirms that the protection area 75 is an unintended area as a result of the checking of the protection area 75, the user clicks the disapproval button 93. The setting transfer process is cancelled by operating the disapproval button 93. Accordingly, the transferred setting data is deleted from the safety scanner 10, and the safety scanner 10 becomes a setting invalid state (unoperating state).

In the simulation mode, a setting state of the edited protection area 75 can be checked without going through the setting data transfer step, the setting data reading step, the setting data check step, the setting data approval step, and each process of operation check in the safety scanner 10. Thus, the edited protection area 75 obtained in the simulation mode is finally reflected as setting of the safety scanner 10 after going through each of the processes described above as setting data. The safety scanner 10 controls the OSSD output to an on state or an off state on the basis of the thus-obtained protection area 75.

Figure 10:
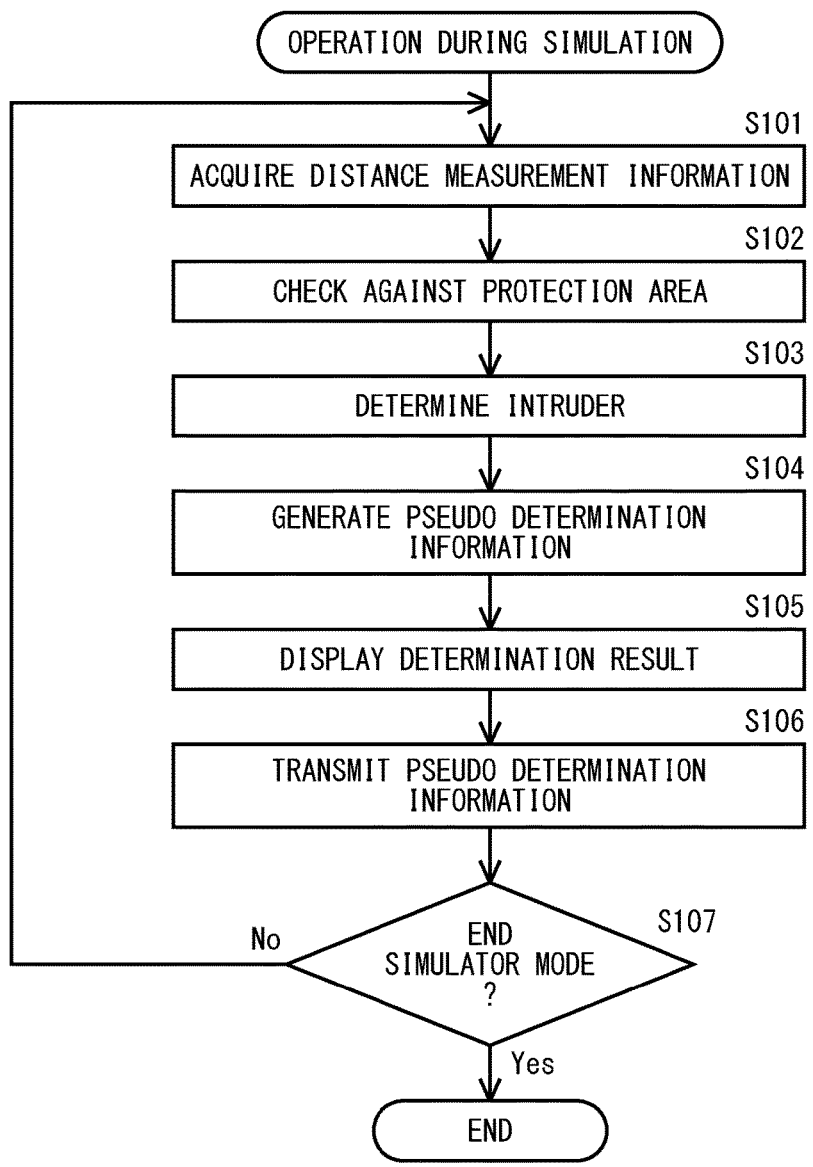
FIG. 10 is a flow chart illustrating an example of the operation of the setting support device of FIG. 5 during a simulation.

FIG. 10 including steps S101 to S107 is a flow chart illustrating an example of the operation of the setting support device 20 of FIG. 5 during a simulation. FIG. 10 illustrates a processing procedure which is performed when the simulation button 70 is operated after creation of area designation information. First, the setting support device 20 acquires distance measurement information from the safety scanner 10, and checks the acquired distance measurement information against the protection area to determine the presence or absence of an intruder (steps S101 to S103).

Then, the setting support device 20 generates pseudo determination information which indicates the determination result of an intruder, displays a determination result corresponding to the pseudo determination information on the edit screen 6, and transmits the pseudo determination information to the safety scanner 10 (steps S104 to S106). The procedure from steps S101 to S106 is repeatedly performed until the end button 82 is operated, and the process is ended when the end button 82 is operated (step S107).

According to the present embodiment, the pseudo determination information is generated by determining the presence or absence of an intruder into the protection area on the basis of the area designation information before being transmitted to the safety scanner 10 and the distance measurement information received from the safety scanner 10 and displayed on the edit screen 6. Thus, it is possible to check whether or not sensing of an intruder is appropriately performed with the protection area which is designated using the setting support device 20 on the basis of the pseudo determination information without transmitting the area designation information to the safety scanner 10.

What is claimed is:

1. An optical safety system comprising:
   a setting support device that generates an area designation information representing a protection area included in a detection area; and
   a safety scanner, having a casing and a port configured to communicate an information with the setting support device, that detects an object within the protection area and outputs a sensing signal;
   wherein the safety scanner includes:
   an area designation information receiver that receives the area designation information from the setting support device;
   a memory that stores the area designation information representing the protection area received from the setting support device as a registered area designation information representing a registered protection area;
   a light emitter that emits a detection light to the detection area;
   a light receiver that receives the detection light reflected from the object within the detection area and generates a light receiving signal in accordance with the detection light;
   a distance calculation section configured to determine a distance to the object on the basis of the light receiving signal;
   a scanner configured to direct the detection light to the detection area to scan the detection area in a circumferential direction around a rotation axis;
   a distance measurement section that obtains a distance measurement information corresponding to the distance determined by the distance calculation section and a scanning angle of the detection light directed by the scanner; and
   an intrusion sensing section that determines an existence of the object within the registered protection area on the basis of the registered area designation information and the distance measurement information obtained by the distance measurement section to output the sensing signal corresponding to the existence of the object within the registered protection area,
   wherein the setting support device includes:
   an area designation information generation section that generates an area designation information representing a protection area as a new area designation information representing a new protection area;
   a distance measurement information receiving section that repeatedly receives and updates the distance measurement information from the safety scanner;
   a simulation generation section that generates a simulation of the intrusion sensing section in the safety scanner that represents an existence of the object into the new protection area on the basis of the new area designation information and the distance measurement information repeatedly received and updated from the safety scanner via the port;
   an edit screen display section that displays the new protection area on an edit screen and a simulated information with respect to the existence of the object into the new protection area corresponding to the simulation of the intrusion sensing section in the safety scanner; and
   a transmitter that transmits, to the safety scanner, the new area designation information representing the new protection area as the area designation information to be received by the area designation information receiver.

2. The optical safety system according to claim 1, wherein the safety scanner further includes:
   an indicator lamp;
   a pseudo determination information receiving section that receives the simulated information from the setting support device; and
   an indicator lamp control section that controls the indicator lamp to indicate an output state of the sensing signal during a normal mode and to indicate the simulated information received from the setting support device via the port during a simulation mode.

3. The optical safety system according to claim 2, wherein the indicator lamp control section controls the indicator lamp to indicate the simulated information distinguishably from the output state of the sensing signal.

4. The optical safety system according to claim 1, wherein the intrusion sensing section repeatedly determines the existence of the object within the registered protection area on the basis of the registered area designation information and the distance measurement information repeatedly obtained by the distance measurement section to repeatedly output the sensing signal corresponding to the existence of the object within the registered protection area even during a period of receiving the simulated information.

5. The optical safety system according to claim 2, wherein the intrusion sensing section outputs a first state signal corresponding to the presence of an object instead of the sensing signal corresponding to the existence of the object within the registered protection area during the simulation mode.

6. The optical safety system according to claim 1, wherein the setting support device further includes a position designation section that designates a position on a scanning plane of the detection light in accordance with a user operation, the edit screen display section displays the scanning plane on the edit screen and displays a group of two dimensional positions corresponding to the distance measurement information repeatedly received from the safety scanner and the position designated by the position designation section on the scanning plane, and the area designation information generation section generates, on the basis of the position designated by the position designation section, the area designation information representing the protection area as the new area designation information representing the new protection area.

7. The optical safety system according to claim 1, wherein the safety scanner further includes:

a marker identification section that identifies a marker movably disposed within the detection area and a distance measurement information of the marker corresponding to a distance to the marker determined by the distance calculation section and a scanning angle of the detection light directed by the scanner; and an area generation information transmission section that transmits the distance measurement information of the marker to the setting support device, wherein the edit screen display section displays a scanning plane of the detection light on the edit screen and displays a position of marker corresponding to the distance measurement information of the marker on the scanning plane, and the area designation information generation section generates the area designation information on the basis of the distance measurement information of the marker.

8. The optical safety system according to claim 1, wherein the area designation information generation section generates the area designation information on the basis of a plurality of distance measurement information obtained within a scanning period of the detection light.

9. An optical safety system comprising:

a setting support device that generates an area designation information representing a protection area included in a detection area; and a safety scanner, having a casing and a port configured to communicate an information with the setting support device, that detects an object within the protection area to protect the object from an industrial machines and outputs a sensing signal having an on-state or an off-state corresponding to an existence or an absence of the object detected within the protection area;

wherein the safety scanner includes:

an area designation information receiver that receives the area designation information from the setting support device;

a memory that stores the area designation information representing the protection area received from the setting support device as a registered area designation information representing a registered protection area;

a light emitter that emits a detection light to the detection area;

a light receiver that receives the detection light reflected from the object within the detection area and generates a light receiving signal in accordance with the detection light;

a distance calculation section configured to determine a distance to the object on the basis of the light receiving signal;

a scanner configured to direct the detection light to the detection area to scan the detection area in a circumferential direction around a rotation axis;

a distance measurement section that obtains a distance measurement information corresponding to the distance determined by the distance calculation section and a scanning angle of the detection light directed by the scanner; and an intrusion sensing section that detects whether the existence or the absence of the object within the registered protection area on the basis of the registered area designation information and the distance measurement information obtained by the distance measurement section, and that generates an on-state signal or an off-state signal as the sensing signal corresponding to the existence or the absence of the object detected within the registered protection area, wherein the setting support device includes:

an area designation information generating section that generate an area designation information representing a protection area as a new area designation information representing a new protection area;

a distance measurement information receiving section that repeatedly receives and updates the distance measurement information from the safety scanner;

a simulator with respect to the intrusion sensing section in the safety scanner, that detects, in a simulation mode, whether an existence or an absence of the object within the new protection area on the basis of the new area designation information and the distance measurement information repeatedly received and updated from the safety scanner via the port, and that generates an on-state signal or an off-state signal as a simulation signal corresponding to the existence or the absence of the object detected within the new protection area in the simulation mode;

an edit screen display section that displays the new protection area on an edit screen, and that displays the simulation signal in the simulation mode; and a transmitter that transmits, to the safety scanner, the new area designation information representing the new protection area as the area designation information to the safety scanner via to be received by the area designation information receiver.

* * * * *